United States Patent [19]
Hashimoto

[11] Patent Number: 4,887,951
[45] Date of Patent: Dec. 19, 1989

[54] DUAL COMPOSITE HEADED SELF-THREADING SCREW

[75] Inventor: Kenzaburo Hashimoto, Hirakata, Japan

[73] Assignee: Maruemu Seisakusho Co., Ltd., Osaka, Japan

[21] Appl. No.: 279,726

[22] Filed: Dec. 5, 1988

[30] Foreign Application Priority Data

Dec. 16, 1987 [JP] Japan .................. 62-191595[U]
Dec. 28, 1987 [JP] Japan .................. 62-199591[U]

[51] Int. Cl.[4] .................. F16B 19/00; F16B 33/00; F16B 43/00
[52] U.S. Cl. .................. 411/371; 411/377; 411/369; 411/542; 411/915
[58] Field of Search .............. 411/369, 370, 371, 373, 411/377, 431, 429, 542, 907, 908, 915

[56] References Cited

U.S. PATENT DOCUMENTS

| | | | |
|---|---|---|---|
| 3,471,158 | 10/1969 | Solins .................. | 411/431 |
| 3,693,495 | 9/1972 | Wagner .................. | 411/377 |
| 4,041,834 | 8/1977 | Herkes et al. .................. | 411/915 |
| 4,482,278 | 11/1984 | Dorn .................. | 411/431 |

FOREIGN PATENT DOCUMENTS

953009 3/1964 United Kingdom .................. 411/377
2129085 5/1984 United Kingdom .................. 411/542

*Primary Examiner*—Neill R. Wilson
*Attorney, Agent, or Firm*—Sixbey, Friedman, Leedom & Ferguson

[57] ABSTRACT

A self-threading screw comprises a screw main body of metal having a small heead portion in the proximal end of a threaded shank and a head of synthetic resin material fitted onto the small head portion. The synthetic resin head has a polygonal socket wrench engaging means formed on the circumferential peripheral thereof. The small head portion has a rotary tool engaging means so that a rotary tool can engage with the engaging means of the small head portion when the synthetic resin head is cut open. The synthetic resin head has an annular seal face formed in the bottom thereof while a stopper porton is provided having a greater diameter than that of the shank portion and extending downwardly of the seal face. Additionally, an annular packing is mounted beneath the seal face so that the stopper face is located between the seal face and the bottom face of the packing.

7 Claims, 3 Drawing Sheets

DUAL COMPOSITE HEADED SELF-THREADING SCREW

BACKGROUND OF THE INVENTION 1. (Field of Industrial Applications)

The present invention relates to a self-threading screw, such as a self-drilling screw or a tapping screw, having a head of synthetic resin.

2. (Prior Art)

There has been provided a "self-drilling screw" which self-threads as self-drilling a workpiece having no pilot holes with its drilling portion formed in the forward end. Also, a "tapping screw" is well known which self-threads for tapping the holes preliminarily formed in workpieces. These screws are called as "self-threading screws".

Particularly in the field of construction industry, such a self-threading screw is widely used for fastening an attachment such as a panel to an objective member since no particular preparation for fastening is required on any of the attachment and objective member. More specifically, the former "self-drilling screw" requires no pilot hole in objective members while the latter "tapping screw" requires pilot holes in objective members but no female threading in the holes. These arrangements facilitate field screwing jobs for various industrial applications.

A major disadvantage of the self-threading screw of this type is however that as the screw is made of metal and rigidly heat treated to ensure its functions described above, its head can rust after attachment and thus, its appearance will be spoied. Also, when used for fastening such a colorful attachment, e.g. a color panel, to an objective member, the screw may have visual defect with the metallic-colored head, which is substantially exposed on the surface of the attachment, failing to match the colors on the panel.

To overcome such problems, there has recently been proposed a modified metal self-threading screw having a head formed of synthetic resin material.

Such a prior art self-threading screw having a synthetic resin head is manufactured by known technics of inserting a small tubular head portion of the metallic screw body into a set of molds and injecting synthetic resin material so that the small tubular head portion can be covered with the material to form a synthetic resin head. The small head portion is arranged having projecting ribs so as to retain the synthetic resin head securely. The synthetic resin head has a socket wrench engaging side formed on the circumferential periphery thereof and arranged into a polygonal shape, e.g. a hexagon.

When this prior art self-threading screw is screwed into a workpiece, its synthetic resin head, although made of particular rigid material having an advanced physical property, such as nylon, may be injured in the polygonal engaging side upon failing to stand against the rotational torque given by a socket wrench and thus, slip off an engaging part of the socket wrench which then turns ineffectively. This results from the fact that since a great rotational torque is needed to force a screw into a workpiece, the socket wrench is commonly turned by a power tool such as an electric tool or a pneumatic tool, so as to provide a considerably great load on the engaging side of the synthetic resin head.

This ineffective turning may occur not only when the self-threading screw has been screwed up in a workpiece but also during the screwing of the self-threading screw into a workpiece. If the socket wrench starts turning ineffectively during the screwing, it will also be impossible to turn the screw in the reverse direction for removal.

SUMMARY OF THE INVENTION

According to the present invention, a self-threading screw comprises a screw main body of metal having a small head portion thereof in the proximal end of a threaded shank thereof and a head of synthetic resin material fitted onto the small head portion. The synthetic resin head has a polygonal socket wrench engaging side formed on the circumferential periphery thereof. The small head portion has a rotary tool engaging side thereof so that a rotary tool can engage with the engaging side of the small head portion when the synthetic head is cut open. The synthetic resin head is preferably formed of short fiber reinforced resin material having the improved properties of crushing pressure resistance and wear resistance. Accordingly, the wrench engaging side of the head provides a less tendency to be injured and slip off the wrench than a prior art head, when it is rotated as engaging with the socket wrench to cause a shank of the screw to self-screw into a workpiece. If the wrench engaging side of the synthetic resin head is injured under pressure and slips off the socket wrench during screwing, the synthetic resin head should then be cut apart and removed to expose the small head portion. By turning the small head portion in the reverse direction with a rotary tool fitted onto the tool engaging side of thereof onto, the self-threading screw can be removed from the workpiece even in the middle of the screwing.

The tool engaging side of the small head portion may become a socket wrench engaging side by arranging into a polygonal shape. Particularly, the small head portion is arranged to correspond to a small-sized socket wrench when left uncovered as the synthetic resin head has been removed by breakage.

Further, the tool engaging side of the small head portion may be incorporated with a screw-driver engaging recess formed on the top surface of the small head portion. The synthetic resin head is attached to the small head portion by filling the screw-driver engaging recess with a part of its synthetic resin material so as to secure each other fixedly. When the synthetic resin head is cut open to expose the small head portion, a screw driver enables to fit into the engaging recess.

According to the present invention, the self-threading screw may include an annular seal face formed in the bottom of the synthetic resin head and a stopper face extending downward from the seal face. A substantially annular packing is also provided beneath the seal face so that the stopper face can be situated between the seal face and the bottom surface of the packing. Accordingly, as the self-threading screw is tightened with the workpiece, the packing is compressed between the seal face and the workpiece and thus, provides the effect of sealing. This prevents rain water from entering the hole in the workpiece along the shank of the screw. When the self-threading screw advances during screwing, it is restricted as its stopper face prevents excessive screwing. As the result, the distance between the seal face and the face of the workpiece is kept constant to allow the packing to be compressed to a specified degree. Thus, the water-tight sealing can be effected with the packing remaining compressed appropriately and also, the packing will last long.

The synthetic resin head may provide a radially projecting annular seat, then the seal face is formed in the bottom of the seat.

Additionally, a neck portion may be provided having a smaller diameter than that of the seal face and extending downwardly of the seal face, then the stopper face is formed in the bottom of the neck portion. The neck portion may be integrally formed with either the synthetic resin head or the metal screw main body at the proximal end of its shank.

The packing includes a substantially annular thickened portion and a substantially annular thinned portion extendeing radially from inner side of the thickened portion, so that the thickened portion is located beneath the seal face while the thinned portion is located beneath the stopper face. Accordingly, when the self-threading screw is tightened with the workpiece, the thinned portion prevents the stopper face from giving the hard impact on the workpiece on striking. Also, the mutual damage to the stopper face and the face of the workpiece due to rubbing can be avoided. Additionally, the thickened portion remains compressed between the seal face and the face of the workpiece while the thinned portion remains compressed between the stopper face and the face of the workpiece, whereby the effect of double sealing can be obtained.

EMBODIMENT

Preferred embodiments of the present invention will be described in detail in conjunction with the drawings.

(FIRST EMBODIMENT)

Figure 1:
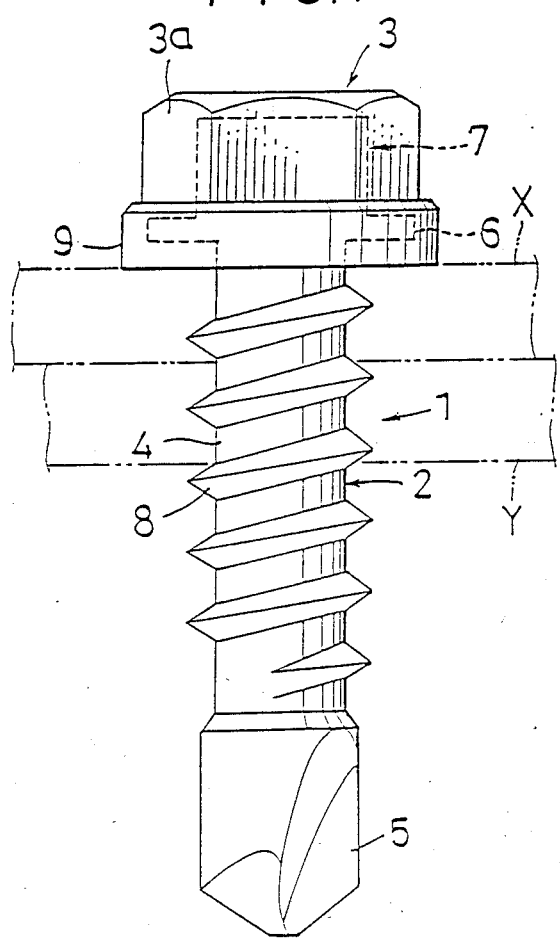
FIG. 1 is a front view showing the entire arrangement of a self-threading screw according to a first embodiment of the prevent invention.
Figure 2:
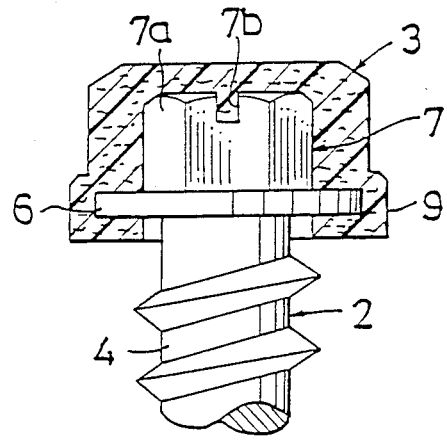
FIG. 2 is a partially cross sectional front view of the head of the first embodiment of the self-threading screw.

As shown in FIGS. 1 and 2, a self-threading screw 1 comprises a screw main body 2 formed of metal for self-threading into a workpiece and a head 3 formed of synthetic resin material.

The metal screw body 2 has a shank portion 4, a drill portion 5 provided in the distal end of the shank portion 4, and a flange-like seat 6 provided in the proximal end of the same, and a small head portion 7 formed adjoining to the seat 6. The shank portion 4 has threads 8 on the periphery.

The synthetic resin head 3 is formed of reinforced resin material which is a mixture of tenacious synthetic resin, e.g. nylon, and short fiber material, e.g. glass fiber or carbon fiber. The synthetic resin head 3 is shaped in effect by inserting the proximal end of the shank portion 4 with the seat 6 and small head portion 7 of the screw body 2 into molds and applying a volume of synthetic resin for injection molding. Particularly, the synthetic resin head 3 is formed monolithically with a seat 9 so that it can cover the small head portion 7 of the screw body 2 while the seat 9 covers the seat 6 of the screw body 2. The seat 9 extends circumferentially of the head 3 to have an annular shape.

According to the present invention, the synthetic resin head 3 and the small head portion 7 of the screw body 2 have socket wrench engaging sides 3a and 7a of polygonal, e.g. hexagonal, shape respectively on the circumferential peripheries thereof. As shown, the socket wrench engaging side 3a of the synthetic resin head 3 is arranged in hexagon greater than the socket wrench engaging side 7a of the small head portion formed in similar hexagon. The small head portion 7a has at top a slot or cross-slot which is designated as a screw-driver engaging recess 7b. Although the small head portion 7 is provided with both the socket wrench engaging side 7a and screw-driver engaging recess 7b in this embodiment, it may be appropriate to provide at least the socket wrench engaging slot 7a.

The self-threading screw 1 of the first embodiment is used for fastening an attachment X such as a panel to an objective member Y in such a manner that it is simply forced into both the workpieces X and Y without preliminary procedures, e.g. forming pilot holes and threads. More specifically, the self-threading screw 1 is placed with its drill portion 5 standing on the workpiece (attachment X) and rotated as with its synthetic resin head 3 engaging with a socket wrench attached to a power tool or pneumatic tool. Then, the drill portion 5 makes a through hole in the attachment X to reach the objective member Y and the shank portion 4 moves in the hole as tapping with the threads 8. As the result, the attachment X is fastened to the objective member Y with the screw 1. During screwing, the synthetic resin head 3 which is formed of short fiber reinforced resin and has the improved properties of crushing pressure resistance and wear resistance, is tightly held by the socket wrench so that ineffective rotating under pressure can be avoided.

If the engaging side 3a of the synthetic resin head 3 is injured during screwing and becomes ineffective to the socket wrench, the small head portion 7 is exposed by cutting out and removing the synthetic resin head 3 with the use of a hammer or like. The screw 1 in screwing can then be removed from the workpiece by fitting a corresponding socket wrech onto the socket wrench engaging side 7a of the small head portion 7 of the metal screw body 2 exposed and rotating it in the reverse direction. In case that the operator has no such a corresponding socket wrench, a screw-driver can be used as fitting the screw-driver engaging recess 7b in the small head portion 7.

(SECOND EMBODIMENT)

Figure 3:
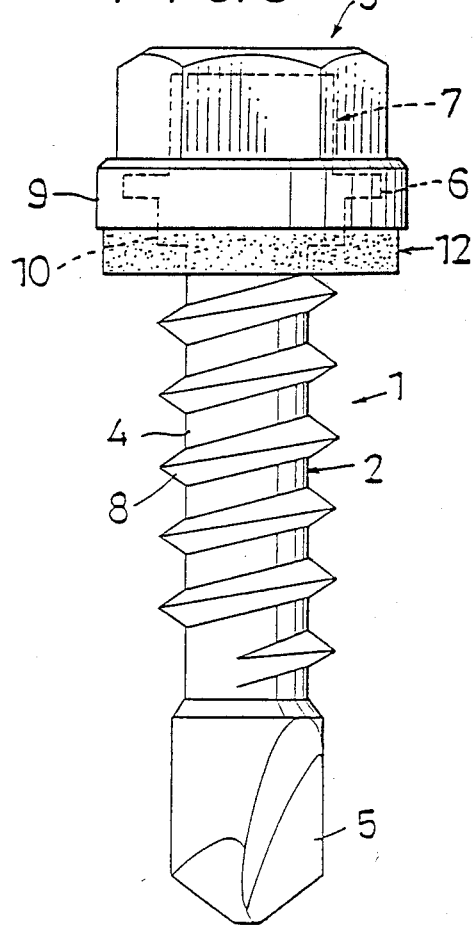
FIG. 3 is a front view showing the entire arrangement of a self-threading screw according to a second embodiment of the present invention.
Figure 4:
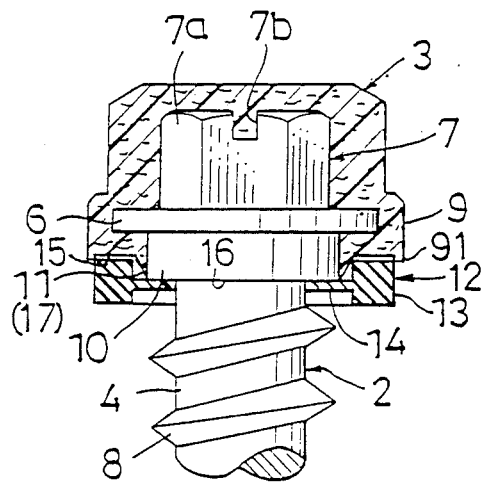
FIG. 4 is a partially cross sectional front view of the head of the second embodiment of the self-threading screw.

In a second embodiment of the present invention as best shown in FIGS. 3 and 4, the metal screw body 2 has a neck portion 10 formed between the proximal end of the shank portion 4 and the flange seat 6 so as to be greater in diameter than the shank portion 4 and smaller than the flange seat 6. The small head portion 7 is the same as in the first embodiment.

The synthetic resin head 3 has a guide sleeve 11 formed monolithically thereof and situated below the seat 9 covering the flange seat 6 so as to cover the circumferential periphery of the neck portion 10. The seat 9 is incorporated with an annular rib 91 arranged circumferentially on the bottom edge thereof.

Accordingly, the synthetic resin head 3 includes an annular seal face 15 defined on the bottom of the seat 9 thereof between the guide sleeve 11 and the rib 91 while the screw body 2 includes a stopper face 16 provided on the bottom of the neck portion 10 thereof. There is an annular packing 12 mounted on the seal face 15.

The packing 12 is monolithically formed of resilient material such as rubber or elastomer having an annular thickened portion 13 arranged beneath the seal face 15 and an annular thinned portion 14 extending radially from the inner side of the thickened portion 13. The packing 12 is arranged in cross section symmetrically with respect to the crosswisely extending center line of the thinned portion 14. The thickened portion 13 has an inner diameter corresponding to the outer diameter of the guide sleeve 11 so as to be fitted onto the guide sleeve 11 while thinned portion 14 has an inner diameter corresponding to the outer diameter of the shank portion 4 (or a root diameter of the threads 8). The packing 12 can be fitted onto the screw body 2 by using the deformable resiliency of the thinned portion 14 so that it comes in contact with the seal face 15. Accordingly, as the thinned portion 14 remains in close contact with the bottom of the neck portion 10 and also, engaged with a part of the threads 8, the packing 12 is prevented from moving for removal towards the point end of the screw body 2. When the inner diameter of the thinned portion 14 is a bit smaller than the outer diameter of the shank portion 4 (or a root diameter of the threads 8), the thinned portion 14 retains the shank portion 4 by means of its resiliency thus to prevent the packing 12 from moving.

As the shank portion 4 of the screw body 2 is threaded in the periphery to have the threads 8, the packing 12 is not always concentric with the guide sleeve 11 when mounted on the shank 4 and engaging with the threads 8 beneath the seal face 15. For improvement, the guide sleeve 11 is formed with a taper face 17 tapered downwardly on the outer periphery thereof as shown in FIG. 4. Accordingly, when the self-threading screw is screwed into the workpiece, the guide sleeve 11 can moves smoothly into the inner periphery in the thickened portion 13 of the packing 12.

According to this second embodiment as well as the first embodiment, there is no need to preliminarily form pilot holes or female threads in the attachment and objective member. The attachment can securely be fastened to the objective member by only forcing the screw 1 into the workpiece for field attachment.

Figure 5:
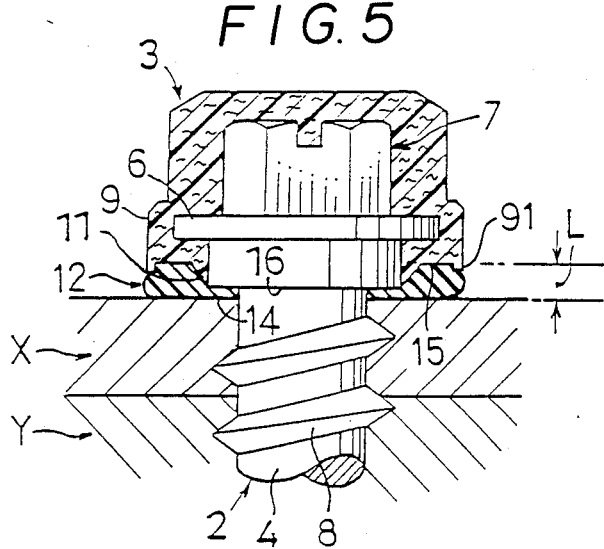
FIG. 5 is a partially cross sectional front view of the same screwed and tightened to a workpiece.

Additionally, when the screwing of the screw 1 into the workpiece is completed as shown in FIG. 5, the packing 12 remains in contact with the workpiece (the attachment X on the front side) as its thickened portion 13 being pressed down so as to seal water-tightly between the seal face 15 and the face of the workpiece X. Even if the attachment X is fastened to the objective member Y with the self-threading screw 1 in the outdoors, the screw 1 provides water-tightness upon screwing to prevent water such as rain drops from entering between the shank portion 4 and the screw hole in the workpiece.

The self-threading screw 1 is arranged to be screwed into the workpiece by a great force of rotating torque applied by a power tool, e.g. an electric tool or a pneumatic tool, and thus, will generally advance over its stop position during screwing as it is difficult to stop the screw 1 at the predetermined position. More particularly, when the self-threading screw 1 of the first embodiment is used with a packing mounted on the lowermost face of the seat 9 of the synthetic resin head 3 and screwed upto the stop position, the packing is excessively compressed between the seat 9 and the surface of the workpiece and thus, deformed as expanding outwardly from the seat 9. If the packing is compressed to excess, it will become deteriorated within a short period of time and reduce the effect of water-tightness.

According to the second embodiment of the present invention, however, when the thickened portion 13 of the packing 12 is compressed to a degree as the self-threading screw 1 advances close to the stop position, the thinned portion 14 of the same comes into contact with the workpiece (the attachment X) as shown in FIG. 5. Simultaneously, the thinned portion 14 is pressed with the stopper face 16 of the neck portion 10 as lessening the impact of the stopper face 16 to the workpiece X. As the screw 1 is further screwed upto the stop position, the thinned portion 14 is compressed to a limit between the stopper face 16 and the face of the workpiece X. Consequently, the excessive screwing of the screw 1 will be prevented. While the thinned portion 14 remains compressed to the limit, the thickened portion 13 is compressed by a specified length L between the seal face 15 of the seat 9 and the face of the workpiece X. At the time, the thickened portion 13 of the packing 12 is restricted at the uppermost edge by the annular rib 91 so as not to expand outwardly and will be compressed between the seal face 15 and the face of the workpiece X without losing the appropriate resiliency.

(FURTHER EMBODIMENT FOR THE STOPPER FACE)

Figure 6:
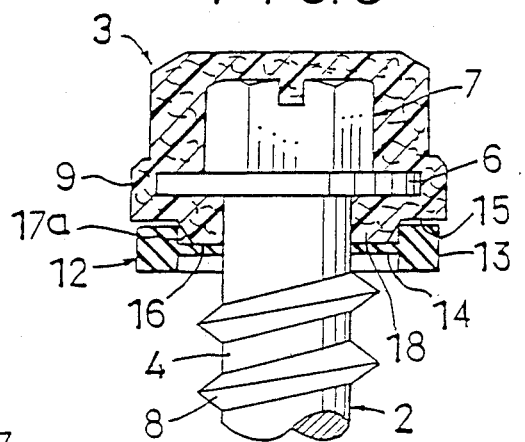
FIG. 6 is a partially cross sectional front view showing the head of a self-threading screw having a stopper face thereof according to a further embodiment of the present invention.

As shown in FIG. 6, the shank portion 4 of the screw body 2 is not provided at the proximal end with such a neck portion as of the second embodiment. Instead, the synthetic resin head 3 includes a neck portion 18 formed monolithically and extending from the seat 9 thereof. The neck portion 18 is tapered downwardly in the outer periphery so as to form a guide face 17a and also, has a stopper face 16 in the bottom thereof.

(FURTHER EMBODIMENT FOR THE PACKING)

Figure 7:
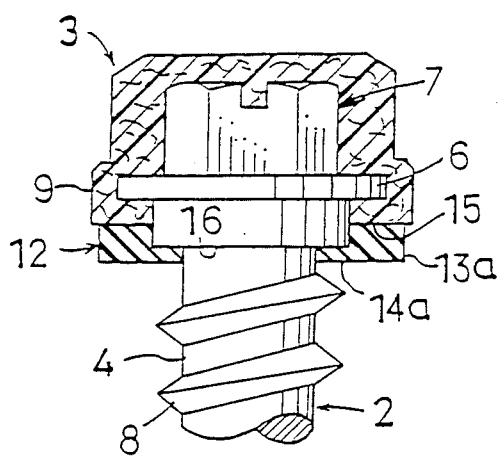
FIG. 7 is a partially cross sectional front view of the head of a self-threading screw provided with a packing according to a still further embodiment of the present invention.

As shown in FIG. 7, the packing 12 includes an annular thickened portion 13a adapted to locate beneath the seal face 15 of the synthetic resin head 3 and an annular thinned portion 14a extending radially from the lowermost of the inner wall of the thickened portion 13a so that it can be L-shaped in half cross section. The thinned portion 14a is arranged to locate beneath the stopper face 16 in the proximal end of the shank 4.

What is claimed is:

1. Dual composite headed self-threading screw comprising:
    a screw main body of metal material having a small head portion thereof in the proximal end of a shank thereof which has threads formed thereon, and a head of synthetic resin material fitted onto the small head portion of said screw main body;

said synthetic resin head being formed of tenacious synthetic resin reinforced by short fiber material, having hexagonal socket wrench engaging sides shaped on the circumferential periphery thereof, and including a substantially annular seat extending from the circumferential periphery thereof, said annular seat having a seal face at the bottom thereof;

said metal screw main body including a cylindrical neck portion formed integrally therewith in the proximal end of the shank portion, said neck portion having a smaller diameter than that of the annular seat of the synthetic resin head, extending downwardly of the seat, and providing a bottom face of said neck portion with a stopper face being exposed from the seat and situated lower than said seal face, so that a substantially annular packing can be placed just beneath the seal face as the stopper face is situated between the seal face and a bottom surface of the packing;

and said small head portion having socket wrench engaging sides formed on the circumferential periphery thereof, said socket wrench engaging sides of said small head portion forming a hexagon smaller in size than the socket wrench engaging sides of the synthetic resin head, so that a corresponding smaller socket wrench can engage with said socket wrench engaging sides of the small head portion when the synthetic resin head is cut upon.

2. Dual composite headed self-threading screw comprising:

a screw main body of metal material having a small head portion thereof in the proximal end of a shank thereof which has threads formed thereon, and a head of synthetic resin material fitted onto the small head portion of said screw main body;

said synthetic resin head having a polygonal socket wrench engaging means formed in the circumferential periphery thereof, and including a substantially annular seat extending from the circumferential periphery thereof, said annular seat having a seal face at the bottom thereof and a substantially annular rib formed on the circumferential end of the bottom thereof;

said shank portion being incorporated with a stopper face formed greater in diameter than the shank portion and situated lower than said seal face, so that a substantially annular packing can be enclosed in said annular rib and placed just beneath the seal face as the stopper face is situated between the seal face and the bottom surface of the packing;

and said small head portion having a rotary tool engaging means, so that a rotary tool can engage with said engaging means of the small head portion when the synthetic resin head is cut upon.

3. Dual composite headed self-threading screw comprising:

a screw main body of metal material having a small head portion thereof in the proximal end of a shank thereof which has threads formed thereon, and a head of synthetic resin material fitted onto the small head portion of said screw main body;

said synthetic resin head having a polygonal socket wrench engaging means formed in the circumferential periphery thereof, and including a substantially annular seat extending from the circumferential periphery thereof, said annular seat having a seal face at the bottom thereof and a substantially annular rib formed on the circumferential end of the bottom thereof;

said metal screw main body including a neck portion formed in the proximal end of the shank portion, said neck portion having a smaller diameter than that of the annular seat of the synthetic resin head, extending downwardly of the seat, and providing its bottom face with a stopper face being situated lower than said seal face, so that a substantially annular packing can be enclosed in said annular rib and placed just beneath the seal face as the stopper face is situated between the seal face and the bottom surface of the packing;

and said small head portion having a rotary tool engaging means, so that a rotary tool can engage with said engaging means of the small head portion when the synthetic resin head is cut upon.

4. Dual composite headed self-threading screw comprising:

a screw main body of metal material having a small head portion thereof in the proximal end of a shank thereof which has threads formed thereon, a head of synthetic resin material fitted onto the small head portion of said screw main body, and a substantially annular packing fitted onto a bottom surface of the synthetic resin head;

said synthetic resin head having a polygonal socket wrench engaging means formed in the circumferential periphery thereof, and including a substantially annular seal face at the bottom thereof while the shank portion is incorporated with a stopper face formed greater in diameter than the shank portion and situated lower than said seal face, so that the packing can be placed just beneath the seal face as the stopper face is situated between the seal face and the bottom surface of the packing;

said packing including a substantially annular thickened portion and a substantially annular thinned portion extending radially from the inner side of said thickened portion, the thickened portion being located beneath the seal face while the thinned portion being located beneath the stopper face;

and said small head portion having a rotary tool engaging means, so that a rotary tool can engage with said engaging means of the small head portion when the synthetic resin head is cup upon.

5. Dual composite headed self-threading screw comprising:

a screw main body of metal material having a small head portion thereof in the proximal end of a shank thereof which has threads formed thereon, and a head of synthetic resin material fitted onto the small head portion of said screw main body;

said synthetic resin head having a polygonal socket wrench engaging means formed in the circumferential periphery thereof, and including a substantially annular seat extending from the circumferential periphery thereof, said annular seat having a seal face at the bottom thereof, and a guide sleeve formed monolithically with the synthetic resin head, said guide sleeve having a taper face provided by tapering the circumferential lowermost end of said guide sleeve;

said metal screw main body including a neck portion formed in the proximal end of the shank portion that is covered at its outer periphery by said guide sleeve, said neck portion having a smaller diameter than that of the annular seat of the synthetic resin head, extending downwardly of the seat, and providing its bottom face with a stopper face being situated lower than said seal face, so that a substantially annular packing can be placed just beneath the seal face as the stopper face is situated between the seal face and the bottom surface of the packing; and said small head portion having a rotary tool engaging means, so that a rotary tool can engage with said engaging means of the small head portion when the synthetic resin head is cut upon.

6. Dual composite headed self-threading screw as defined in one of the claims 2 to 5 wherein the rotary tool engaging means of the small head portion is a polygonal socket wrench engaging means formed smaller in size than the wrench engaging means of the synthetic resin head.

7. Dual composite headed self-threading screw as defined in one of the claims 2 to 5 wherein the rotary tool engaging means of the small head portion has a screw-driver engaging recess formed on the top surface of the small head portion, said screw-driver engaging recess being fitted with a part of the synthetic resin material forming the synthetic resin head.

* * * * *